US012214585B2

(12) United States Patent
Mukaida

(10) Patent No.: US 12,214,585 B2
(45) Date of Patent: Feb. 4, 2025

(54) RECORDING DEVICE

(71) Applicant: Seiko Epson Corporation, Tokyo (JP)

(72) Inventor: Atsushi Mukaida, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/549,254

(22) Filed: Dec. 13, 2021

(65) Prior Publication Data

US 2022/0184977 A1 Jun. 16, 2022

(30) Foreign Application Priority Data

Dec. 14, 2020 (JP) ................................. 2020-206547
Aug. 4, 2021 (JP) ................................. 2021-128294

(51) Int. Cl.

*B41J 2/01* (2006.01)
*B41J 11/00* (2006.01)
*B41J 11/04* (2006.01)
*B41J 13/00* (2006.01)
*B41J 13/02* (2006.01)
*B41J 13/26* (2006.01)

(52) U.S. Cl.

CPC ........... *B41J 13/02* (2013.01); *B41J 11/0045* (2013.01); *B41J 11/04* (2013.01); *B41J 13/0018* (2013.01); *B41J 13/0027* (2013.01); *B41J 13/0045* (2013.01); *B41J 13/009* (2013.01); *B41J 13/26* (2013.01)

(58) Field of Classification Search

CPC ...... B41J 2/01; B41J 11/0045; B41J 13/0018; B41J 13/0027; B41J 13/0045; B41J 13/009; B41J 13/02; B41J 13/26
See application file for complete search history.

(56) References Cited

U.S. PATENT DOCUMENTS

2006/0061638 A1* 3/2006 Amarume ............ B41J 2/17596 347/84
2010/0237554 A1* 9/2010 Okumura ............... B65H 9/006 271/110

(Continued)

FOREIGN PATENT DOCUMENTS

JP 2013-209177 A 10/2013
JP 2015-174726 10/2015

(Continued)

*Primary Examiner* — Justin Seo
*Assistant Examiner* — Kendrick X Liu
(74) *Attorney, Agent, or Firm* — WORKMAN NYDEGGER

(57) ABSTRACT

A recording device includes a pair of transport rollers for transporting a medium, a rotating body provided downstream of the pair of transport rollers in a transport path of the medium and configured to switch between a first state in which the medium being nipped by the pair of transport rollers is passed and a second state in which the the medium being nipped by the pair of transport rollers is not passed, and a recording portion performing recording on the medium by discharging a liquid, in which the pair of transport rollers includes a first toothed roller having a plurality of convex portions configured to make point contact with the medium and nipping the medium by the plurality of the convex portions, and, the pair of transport rollers is arranged only in a central region when the transport path is divided into three in a rotating shaft direction.

16 Claims, 11 Drawing Sheets

(56) References Cited

U.S. PATENT DOCUMENTS

| | | | | |
|---|---|---|---|---|
| 2017/0120632 | A1* | 5/2017 | Nakahata | B65H 85/00 |
| 2017/0259591 | A1* | 9/2017 | Tamura | B41J 13/025 |
| 2018/0236797 | A1* | 8/2018 | Ohashi | B41J 25/316 |
| 2018/0282093 | A1 | 10/2018 | Matsui et al. | |
| 2018/0297379 | A1 | 10/2018 | Nakahata et al. | |
| 2019/0111704 | A1* | 4/2019 | Kawabe | B41J 2/17 |
| 2020/0039776 | A1 | 2/2020 | Saito et al. | |

FOREIGN PATENT DOCUMENTS

| | | |
|---|---|---|
| JP | 2017-088260 | 5/2017 |
| JP | 2018-177379 | 11/2018 |
| JP | 2020-023372 | 2/2020 |

* cited by examiner

RECORDING DEVICE

The present application is based on, and claims priority from JP Application Serial Number 2020-206547, filed on Dec. 14, 2020, and JP Application Serial Number 2021-128294, filed on Aug. 4, 2021, the disclosures of which are hereby incorporated by reference herein in their entirety.

BACKGROUND

1. Technical Field

The present disclosure relates to a recording device.

2. Related Art

To date, recording devices with various configurations have been used. Among these, there is a recording device capable of correcting a skewed transport of a medium when the medium to be transported along a transport path is skewedly transported. For example, JP-A-2017-88260 discloses a recording device provided with a pair of correction rollers and capable of correcting a skewed transport of a medium by abutting a medium being transported in a supply path against the pair of correction rollers.

However, in the recording device of the related art capable of correcting the skewed transport of the medium, depending on the type of medium used or the configuration of a transport portion that transports the medium, even when a mechanism for correcting the skewed transport of the medium is provided, the skewed transport of the medium may not be sufficiently corrected. When correcting the skewed transport in the recording device including the pair of correction rollers and the transport portion capable of abutting the medium against the pair of correction rollers, the medium is bent and transported by the transport portion in a state in which a tip portion of the medium is abutted against the pair of correction rollers, thereby correcting the skewed transport. In such a recording device, for example, when thick paper is transported, it is difficult to bend the medium, and it is difficult to correct the skewed transport. Further, for example, when using a pair of transport rollers with a long nip width as the transport portion, since the medium is nipped to be long in a width direction, it is difficult for the medium to shift in the width direction, and it is difficult to correct the skewed transport. On the other hand, when the nip width of the pair of transport rollers is simply shortened, a force for transporting the medium is reduced.

SUMMARY

A recording device according to an aspect of the present disclosure includes a pair of transport rollers for transporting a medium, a rotating body provided downstream of the pair of transport rollers in a transport path of the medium and configured to switch between a first state in which a tip portion of the medium being nipped by the pair of transport rollers is passed and a second state in which the tip portion of the medium being nipped by the pair of transport rollers is not passed, and a recording portion provided downstream of the rotating body in the transport path and performing recording on the medium by discharging a liquid, in which the pair of transport rollers includes a first toothed roller having a plurality of convex portions configured to make point contact with the medium on an outer peripheral portion and nipping the medium by the plurality of the convex portions, and the pair of transport rollers is arranged only in a central region when the transport path is divided into three in a width direction corresponding to a rotating shaft direction of the first toothed roller.

DESCRIPTION OF EXEMPLARY EMBODIMENTS

Figure 1:
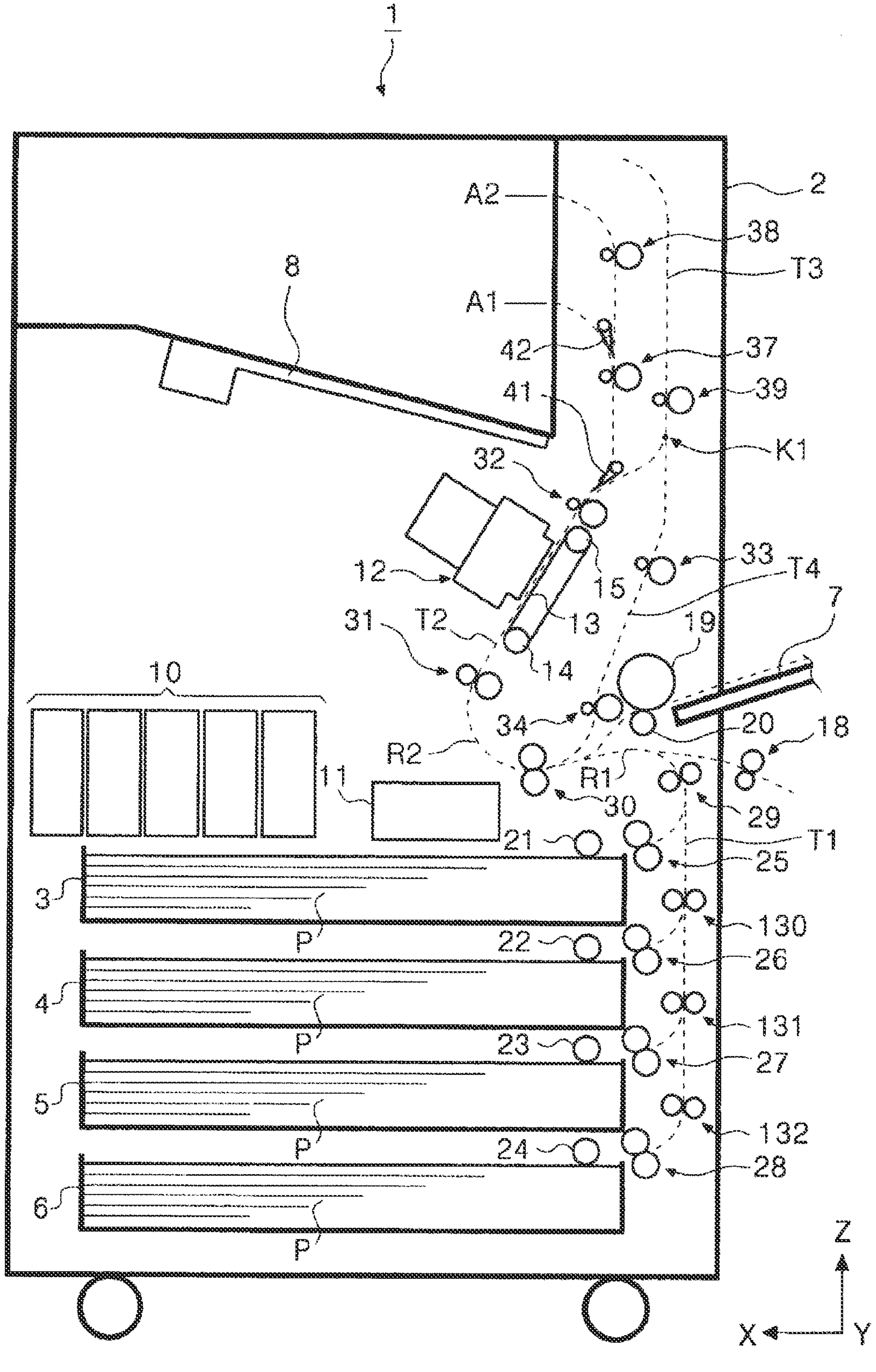
FIG. 1 is a view showing a medium transport path of an ink jet printer.

Hereinafter, the present disclosure will be briefly described.

A recording device according to a first aspect includes a pair of transport rollers for transporting a medium, a rotating body provided downstream of the pair of transport rollers in a transport path of the medium and configured to switch between a first state in which a tip portion of the medium being nipped by the pair of transport rollers is passed and a second state in which the tip portion of the medium being nipped by the pair of transport rollers is not passed, and a recording portion provided downstream of the rotating body in the transport path and performing recording on the medium by discharging a liquid, in which the pair of transport rollers includes a first toothed roller having a plurality of convex portions configured to make point contact with the medium on an outer peripheral portion and nipping the medium by the plurality of the convex portions, and when a rotating shaft direction of the first toothed roller is a width direction, the pair of transport rollers is arranged only in a central region when the transport path is divided into three in the width direction.

According to the present aspect, the pair of transport rollers is arranged only in the central region when the transport path is divided into three in the width direction. Therefore, the medium can be rotated around a nip position, which is narrow in the width direction, in the central region as the center of a rotation axis, and the skewed transport of the medium can be effectively corrected. In addition, since the pair of transport rollers includes the first toothed roller that nips the medium through the plurality of convex portions, the medium can be transported by being bitten by the plurality of convex portions of the first toothed roller, and a decrease in the force for transporting the medium can be suppressed. That is, according to the present aspect, it is possible to correct the skewed transport of the medium without reducing the force for transporting the medium.

In a second aspect according to the first aspect, the first toothed roller includes, in the width direction, a plurality of tooth members having a plurality of convex portions configured to make point contact with the medium along an outer peripheral portion.

According to the present aspect, the first toothed roller includes the plurality of tooth members having the plurality of convex portions along the outer peripheral portion in the width direction. Therefore, even when the number of convex portions of each tooth member is reduced, the number of convex portions of the entire first toothed roller can be increased. By reducing the number of convex portions of each tooth member, it is possible to facilitate the manufacture of the tooth member and reduce the cost. In addition, since the number of convex portions of the entire first toothed roller can be increased by providing the plurality of tooth members, it is possible to effectively suppress a decrease in the force for transporting the medium.

In a third aspect according to the first or second aspect, the transport path includes a reversion path in which the medium on which recording is performed by the recording portion is reversed and the medium reversed is supplied to a supply path, the rotating body includes a second toothed roller having a plurality of convex portions configured to make point contact with the medium on an outer peripheral portion, and an outer diameter of the first toothed roller is equal to or larger than an outer diameter of the second toothed roller.

According to the present aspect, the outer diameter of the first toothed roller can be increased. By increasing the outer diameter of the first toothed roller, the time from when one convex portion bites the medium to when one convex portion subsequently bites the medium can be lengthened. For example, in the case in which the recording is performed on both sides of the medium, when the first toothed roller comes into contact with the medium to which liquid has attached, the time from when one convex portion comes into contact with the medium to when one convex portion comes into contact with the medium can be lengthened. By lengthening the time, the time can be set as a sufficient drying time of the liquid, and the liquid attached to the convex portion can be suppressed from being re-attached to the medium.

In a fourth aspect according to any one of the first to third aspects, the transport path includes a supply path for supplying the medium mounted on a mounting portion to the recording portion, the pair of transport rollers and the rotating body are arranged in the supply path, and the supply path includes a vertically upward path for transporting the medium vertically upward between the pair of transport rollers and the rotating body.

According to the present aspect, the supply path includes the vertically upward path. Therefore, the supply path can be reduced in a horizontal direction, and an installation area of the recording device can be reduced.

In a fifth aspect according to the fourth aspect, the supply path includes a curved path between the pair of transport rollers and the rotating body, and the curved path is provided with a bending space that expands to an outside to allow bending of the medium being transported in the curved path.

According to the present aspect, the curved path is provided with the bending space that expands outward to allow the bending of the medium being transported in the curved path. Therefore, the bending space can be used at the time of skewed correction, and a restoring force associated with the bending of the medium can be used to effectively correct the skewed transport of the medium.

In a sixth aspect according to the fifth aspect, the supply path is provided with a displacement member in which a fixed end is provided upstream of the bending space and a free end is provided downstream of the fixed end so that a free end side is configured to be displaced with respect to the fixed end, and the bending space extends to an outside of the displacement member.

In a case in which the medium bends too much outward when the medium is transported, a transport failure may occur, but according to the present aspect, by displacing the displacement member, it is possible to prevent the medium from bending too much outward when the medium is transported. In addition, by displacing the displacement member, the medium can be sufficiently bent at the time of skewed correction. In addition, since it is possible to reduce the risk of transport failure even when the bending space is large by providing the displacement member, the skewed transport of the medium can be effectively corrected even when a medium such as thick paper, which is generally difficult to perform the skewed correction, is used.

In a seventh aspect according to the fifth or sixth aspect, the recording portion is positioned on a side of the transport path, the side being the outside, and the first toothed roller is positioned on a side of the transport path, the side being an inside of the curved path.

According to the present aspect, the recording portion is positioned on the same side as the outside of the curved path with respect to the transport path. Since there is no need to provide the recording portion in a region surrounded by the supply path and a reversion path, it is not necessary to widen the region surrounded by the supply path and the reversion path, and the recording device can be miniaturized.

In an eighth aspect according to any one of the first to seventh aspects, the rotating body is configured with a pair of rollers having a rotating shaft in the width direction, and a nip width of the pair of transport rollers in the width direction is 0.25 times or less a nip width of the rotating body in the width direction.

According to the present aspect, the nip width in the width direction of the pair of transport rollers is 0.25 times or less the nip width in the width direction of the rotating body. With such a configuration, an effect of skewed correction can be particularly improved.

In a ninth aspect according to any one of the first to eighth aspects, a nip force of the first toothed roller with respect to the medium is 3.0 N or more and 6.0 N or less.

According to the present aspect, the nip force of the first toothed roller with respect to the medium is 3.0 N or more and 6.0 N or less. With such a configuration, it is possible to suppress a decrease in transportability of the medium, and for example, suppress the attachment of the liquid to the first toothed roller when recording on both sides of the medium.

In a tenth aspect according to any one of the first to ninth aspects, as viewed in the width direction, an angle formed by a tip portion of each of the plurality of convex portions included in the first toothed roller is 60° or more and 70° or less.

As the number of convex portions increases, foreign matter such as liquid tends to be attached to the tooth member, but according to the present aspect, by setting the angle formed by the tip portion of the convex portion to 60° or more, it is possible to suppress the number of convex portions from being too large, and it is possible to suppress the foreign matter such as liquid from being attached to the tooth member. In addition, when the number of convex portions per one toothed roller is too small, the transport force of the medium tends to decrease, but according to the present aspect, by setting the angle formed by the tip portion of the convex portion to 70° or less, a distance between adjacent convex portions in a circumferential direction can be shortened in each tooth member, it is possible to suppress the number of convex portions per one tooth member from being too small, and it is possible to suppress a decrease in the transport force of the medium.

In an eleventh aspect according to any one of the first to ninth aspects, a thickness of the convex portion in the width direction is 0.05 mm or more and 0.10 mm or less.

It is difficult to easily make the thickness of the convex portion thin in the width direction, which causes an increase in cost, but according to the present aspect, since the thickness of the convex portion in the width direction is 0.05 mm or more, the convex portion can be easily constructed by press processing or the like, and the tooth member can be easily constructed at low cost. In addition, when the thickness of the convex portion in the width direction is made too thick, the foreign matter such as liquid tends to be attached to the convex portion, and the foreign matter attached to the convex portion may be transferred to the medium, but according to the present aspect, since the thickness of the convex portion in the width direction is 0.10 mm or less, it is possible to suppress the thickness of the convex portion in the width direction from being too thick, and it is possible to reduce the possibility that the foreign matter attached to the convex portion is transferred to the medium.

Hereinafter, the present disclosure will be specifically described. Hereinafter, an ink jet printer 1 that performs recording by ejecting ink, which is an example of a liquid, onto a medium P typified by recording paper will be described as an example of a recording device. Hereinafter, the ink jet printer 1 is abbreviated as a printer 1. An X-Y-Z coordinate system shown in each figure is a Cartesian coordinate system, and a Y-axis direction is the width direction that intersects a transport direction of the medium P and corresponds to a depth direction of the device and also corresponds to a rotating shaft direction of each of the following pairs of transport rollers. An X-axis direction is a width direction of the device, and a +X direction is on a left side and a −X direction is on the right side when viewed from an operator of the printer 1. A Z-axis direction is a vertical direction, that is, a height direction of the device, and a +Z direction is an upward direction and a −Z direction is a downward direction. In the following, the direction in which the medium P is transported may be referred to as "downstream", and an opposite direction may be referred to as "upstream". In addition, in FIG. 1, the transport path of the medium P is indicated by a broken line. In the printer 1, the medium P is transported through the transport path indicated by the broken line.

First, an overall outline of the printer 1 will be described with reference to FIG. 1. As shown in FIG. 1, the printer 1 includes a plurality of medium cassettes in a lower portion of a device main body 2 in a vertical direction. In the present embodiment, these medium cassettes of a second medium cassette 4, a third medium cassette 5, and a fourth medium cassette 6 are provided in this order from a first medium cassette 3, which is uppermost, in a downward direction. Each medium cassette is an example of a mounting portion on which the medium P can be mounted and accommodated.

Each medium cassette is provided with a pick roller that feeds the accommodated medium P in a −X direction. The first medium cassette 3 is provided with a pick roller 21, the second medium cassette 4 is provided with a pick roller 22, the third medium cassette 5 is provided with a pick roller 23, and the fourth medium cassette 6 is provided with a pick roller 24.

In addition, each medium cassette is provided with a pair of feeding rollers that feeds the medium P, fed in the −X direction, in a diagonally upward direction including a −X direction component and a +Z direction component. The first medium cassette 3 is provided with a pair of feeding rollers 25, the second medium cassette 4 is provided with a pair of feeding rollers 26, the third medium cassette 5 is provided with a pair of feeding rollers 27, and the fourth medium cassette 6 is provided with a pair of feeding rollers 28. In the following, unless otherwise specified, the "pair of rollers" includes a drive roller driven by a motor (not shown) and a driven roller that is in contact with the drive roller and driven to rotate.

The medium P fed from the first medium cassette 3 and transported in the diagonally upward direction by the pair of feeding rollers 25 receives a feeding force from a pair of transport rollers 29 and is fed in the diagonally upward direction including the +X direction component and the +Z direction component. The medium P fed from the second medium cassette 4 and transported in the diagonally upward direction by the pair of feeding rollers 26 receives a feeding force from a pair of transport rollers 130 and is fed in an upward direction and reaches the pair of transport rollers 29. The medium P fed from the third medium cassette 5 and transported in the diagonally upward direction by the pair of feeding rollers 27 is fed in the upward direction by the pair of transport rollers 131 and the pair of transport rollers 130 and reaches the pair of transport rollers 29. The medium P fed from the fourth medium cassette 6 and transported in the diagonally upward direction by the pair of feeding rollers 28 is fed in the upward direction by a pair of transport rollers 132, the pair of transport rollers 131, and the pair of transport rollers 130 and reaches the pair of transport rollers 29. As described above, the pair of transport rollers 29 feeds the medium P in the diagonally upward direction including the +X direction component and the +Z direction component.

A transport path downstream from the pair of transport rollers 29 is curved so as to be convex upward, and the medium P reaches a pair of transport rollers 30 through a curved path portion. In addition, a pair of transport rollers 31 is provided downstream of the pair of transport rollers 30. In the following, the transport path until the medium P fed from each medium cassette reaches the pair of transport rollers 31 is referred to as a "supply path T1". In addition, in the supply path T1, a path portion curved to be convex upward between the pair of transport rollers 29 and the pair of transport rollers 30 is referred to as a "first curved path R1". The supply path T1 is a path that reverses the medium P fed from each medium cassette in a medium feeding direction from each medium cassette, that is, a transport direction including a component in the +X direction opposite to the −X direction. Then, the supply path T1 joins a reversion path T4, which will be described later, at a position upstream of the pair of transport rollers 30.

A pair of external transport rollers 18 in the vicinity of the pair of transport rollers 29 and shown on the outside of the device main body 2 is a pair of rollers provided in an extension unit (not shown). The extension unit is configured to accommodate the medium P and is configured so that the medium P fed from a feeding roller (not shown) can be supplied into the printer 1 by the pair of external transport rollers 18.

In addition, a supply tray 7 protruding from a side surface of the device main body 2 to the outside of the device is provided in the vicinity of the first curved path R1. The supply tray 7 is a tray for manually feeding the medium P, and the medium P is supplied from the supply tray 7 into the printer 1 by a supply roller 19 and a separation roller 20. The medium P fed into the device via the supply tray 7 enters the supply path T1.

The medium P that receives the feeding force from the pair of transport rollers 29 reaches the pair of transport rollers 31 through a curved path that is curved so as to be convex downward. In the following, in a curved path curved so as to be convex downward between a pair of transport rollers 34 and the pair of transport rollers 31, which will be described later, a region from the pair of transport rollers 30 to the pair of transport rollers 31 is referred to as a "second curved path R2".

The medium P that receives the feeding force from the pair of transport rollers 31 is fed between a line head 12, which is an example of the recording portion, and a transport belt 13, that is, at a recording position facing the line head 12. In the following, the transport path from the pair of transport rollers 31 to the pair of transport rollers 32 will be referred to as a "recording transport path T2". The line head 12 ejects ink, which is an example of a liquid, onto a surface of the medium P to perform recording. The line head 12 is an ink ejection head configured such that a nozzle for ejecting the ink covers an entire region of the medium in a width direction and is configured as an ink ejection head capable of recording over an entire width of the medium without moving in the width direction of the medium. However, the ink ejection head is not limited thereto and may be of a type that is mounted on a carriage and ejects the ink while moving in the width direction of the medium.

The ink ejected from the line head 12 is supplied from an ink accommodating portion 10 to the line head 12 via a tube (not shown). The ink accommodating portion 10 includes a plurality of ink tanks arranged in the X-axis direction. The ink as a waste liquid ejected from the line head 12 toward a flushing cap (not shown) for maintenance is stored in a waste liquid accommodating portion 11.

The transport belt 13 is an endless belt that is hung around a pulley 14 and a pulley 15 and rotates when at least one of the pulley 14 and the pulley 15 is driven by a motor (not shown). The medium P is transported at a position facing the line head 12 while being adhered to the belt surface of the transport belt 13. As the adhesion of the medium P to the transport belt 13, a known adhesion method such as an air suction method or an electrostatic adhesion method can be adopted.

Here, the recording transport path T2 passing through the position facing the line head 12 forms an angle with respect to a horizontal direction and a vertical direction and is configured to transport the medium P diagonally upward. Such a diagonally upward transport direction is a direction including the −X direction component and the +Z direction component in FIG. 1, and with such a configuration, a horizontal dimension of the printer 1 can be suppressed. In the present embodiment, the recording transport path T2 is set at an inclination angle in the range of 50° to 70° with respect to the horizontal direction and, more specifically, is set at an inclination angle of approximately 60°.

The medium P on a first surface of which recording is performed by the line head 12 is further fed in the diagonally upward direction including the −X direction component and the +Z direction component by the pair of transport rollers 32 positioned downstream of the transport belt 13. A flap 41 is provided downstream of the pair of transport rollers 32 and the transport direction of the medium P is switched by the flap 41. When the medium P is discharged as it is, the transport path of the medium P is switched by the flap 41 so as to be directed toward a pair of transport rollers 37 positioned upward. A flap 42 is further provided downstream of the pair of transport rollers 37, and the flap 42 switches the transport path to either discharge from a discharge position A1 or transport to the pair of transport rollers 38 positioned further vertically upward. When the medium P is fed toward the pair of transport rollers 38, the medium P is discharged from a discharge position A2. The medium P discharged from the discharge position A1 is received by a discharge tray 8 inclined in the diagonally upward direction including the +X direction component and the +Z direction component. The medium P discharged from the discharge position A2 is received by an optional tray (not shown).

When recording is performed on a second surface in addition to the first surface of the medium P, the medium P is fed by the flap 41 in the diagonally upward direction including the −X direction component and the +Z direction component, passes through a branch position K1, and enters a switchback path T3. In the present embodiment, the switchback path T3 is a transport path above the branch position K1. The switchback path T3 is provided with a pair of transport rollers 39. The medium P that has entered the switchback path T3 is transported upward by the pair of transport rollers 39, and when a rear end of the medium P passes through the branch position K1, a rotation direction of the pair of transport rollers 39 is switched, whereby the medium P is transported downward.

The reversion path 14 is coupled to the switchback path T3. In the present embodiment, the reversion path 14 is a transport path from the branch position K1 through the pair of transport rollers 33, the pair of transport rollers 34, and the pair of transport rollers 30 in this order to reach the pair of transport rollers 31. The reversion path 14 includes the second curved path R2 described above. The medium P transported downward by the pair of transport rollers 33 receives the feeding force from the pair of transport rollers 33 and the pair of transport rollers 34, reaches the pair of transport rollers 30, and is fed to a position facing the line head 12 again by the pair of transport rollers 30. That is, the reversion path T4 is a path that transports the medium P in a transport direction including the vertically downward component and reverses the medium P in a transport direction including a vertically upward component via the second curved path R2 that is convex downward.

In the medium P fed to the position facing the line head 12 again, the second surface opposite to the first surface on which the recording has already been performed faces the line head 12. As a result, the line head 12 can perform the recording on the second surface of the medium P. The medium P on the second surface of which the recording is performed is discharged from the discharge position A1 or the discharge position A2 described above.

Hereinafter, the configuration of the pair of transport rollers 30 and the configuration of the second curved path R2, which is the transport path from the pair of transport rollers 30 to the pair of transport rollers 31, which are main portions of the printer 1 of the present embodiment will be described in detail with reference to FIGS. 2 to 7. As described above, the printer 1 of the present embodiment includes the pair of transport rollers 30 for transporting the medium P, the pair of transport rollers 31 provided downstream of the pair of transport rollers 30 in the transport path, and the line head 12 provided downstream of the pair of transport rollers 31 in the transport path and performing recording on the medium P by ejecting the ink. Here, the pair of transport rollers 31 is a rotating body capable of switching between a first state in which a tip portion of the medium P being nipped by the pair of transport rollers 30 is passed and a second state in which the tip portion of the medium P being nipped by the pair of transport rollers 30 is not passed. Then, the medium P is transported by the pair of transport rollers 30 and abutted against the pair of transport rollers 31, so that a skewed transport of the medium P can be corrected.

Figure 2:
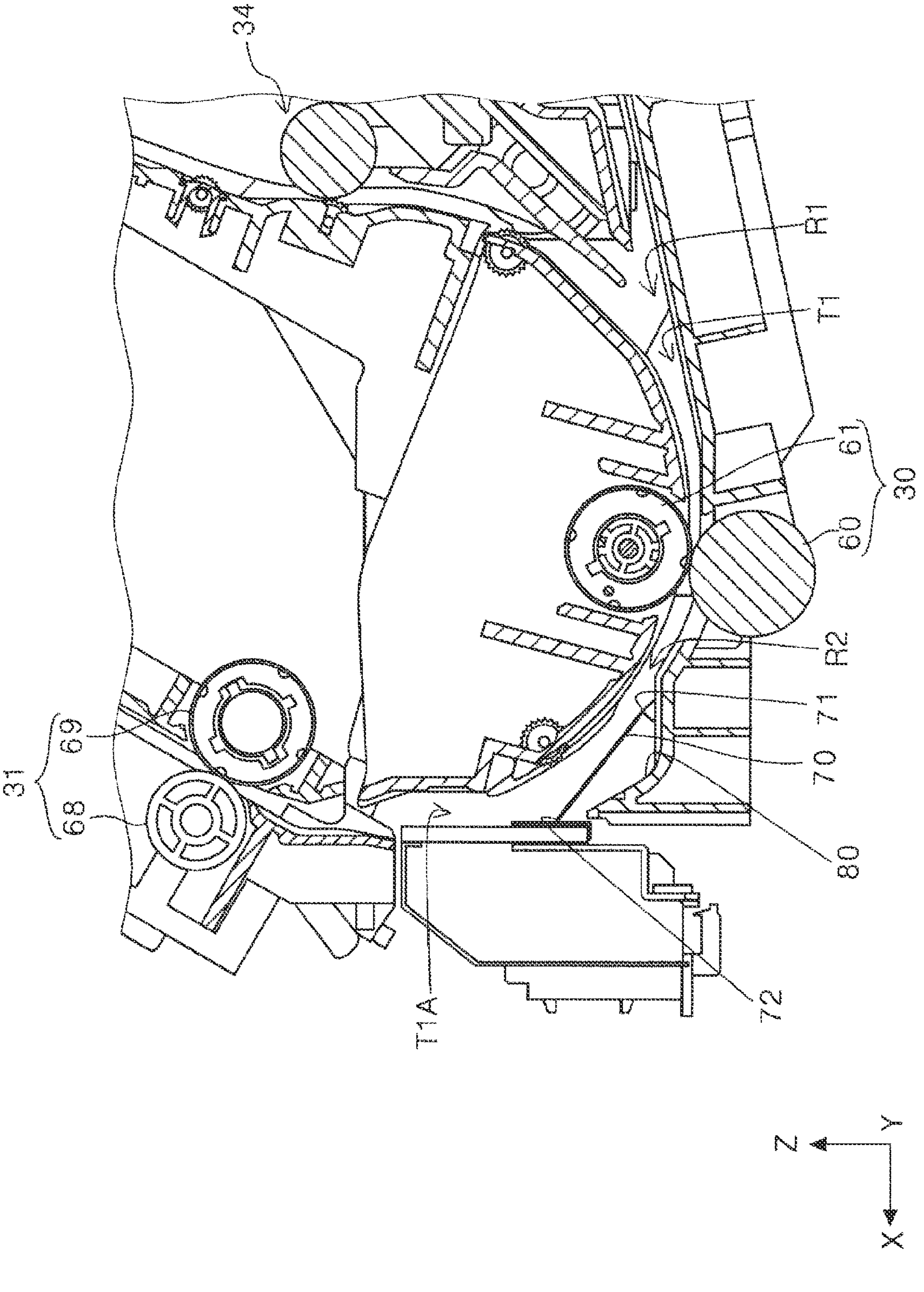
FIG. 2 is a side view showing the periphery of a pair of transport rollers of the ink jet printer of FIG. 1.
Figure 3:
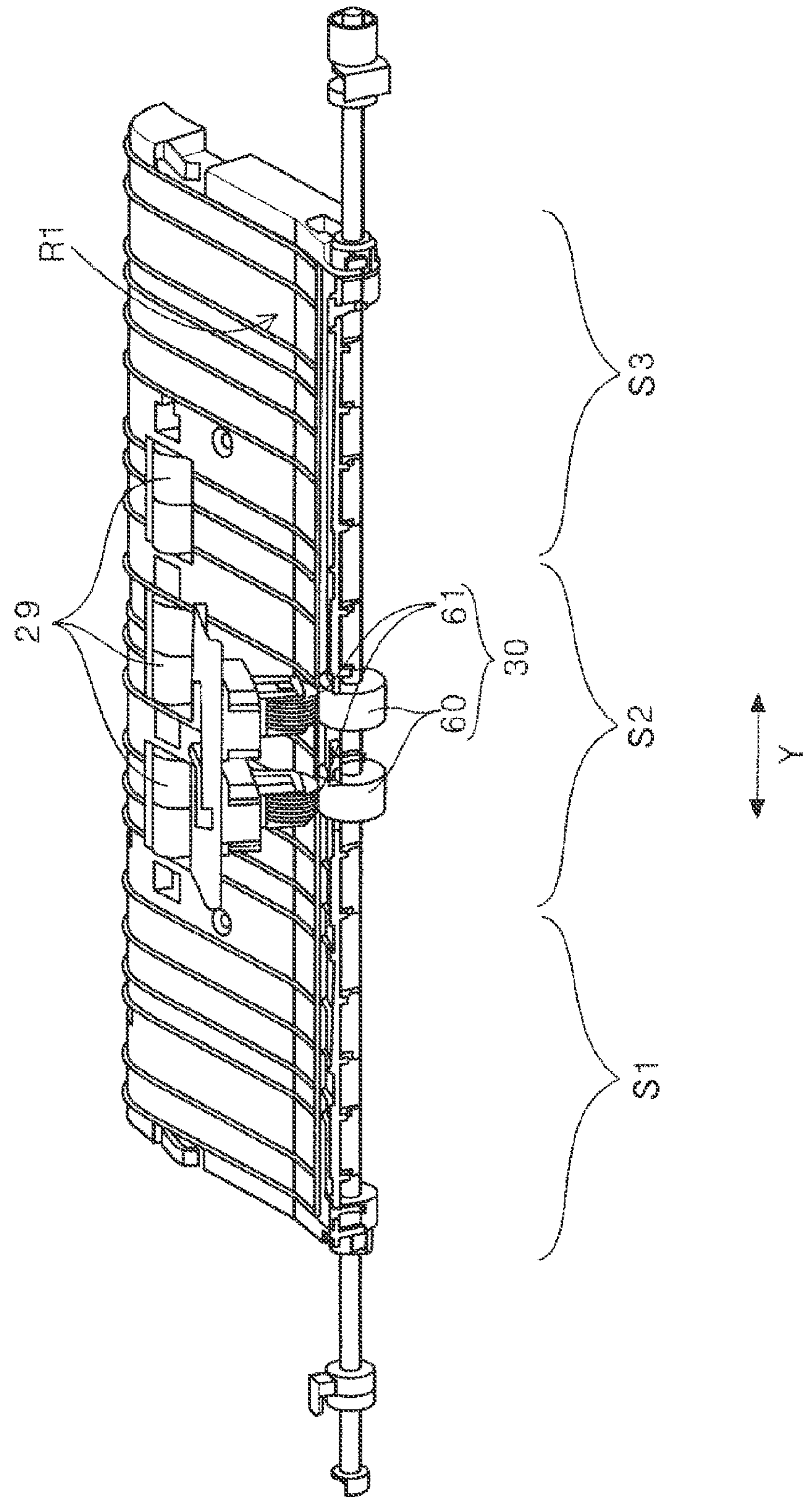
FIG. 3 is a perspective view of the pair of transport rollers of the ink jet printer of FIG. 1.
Figure 5:
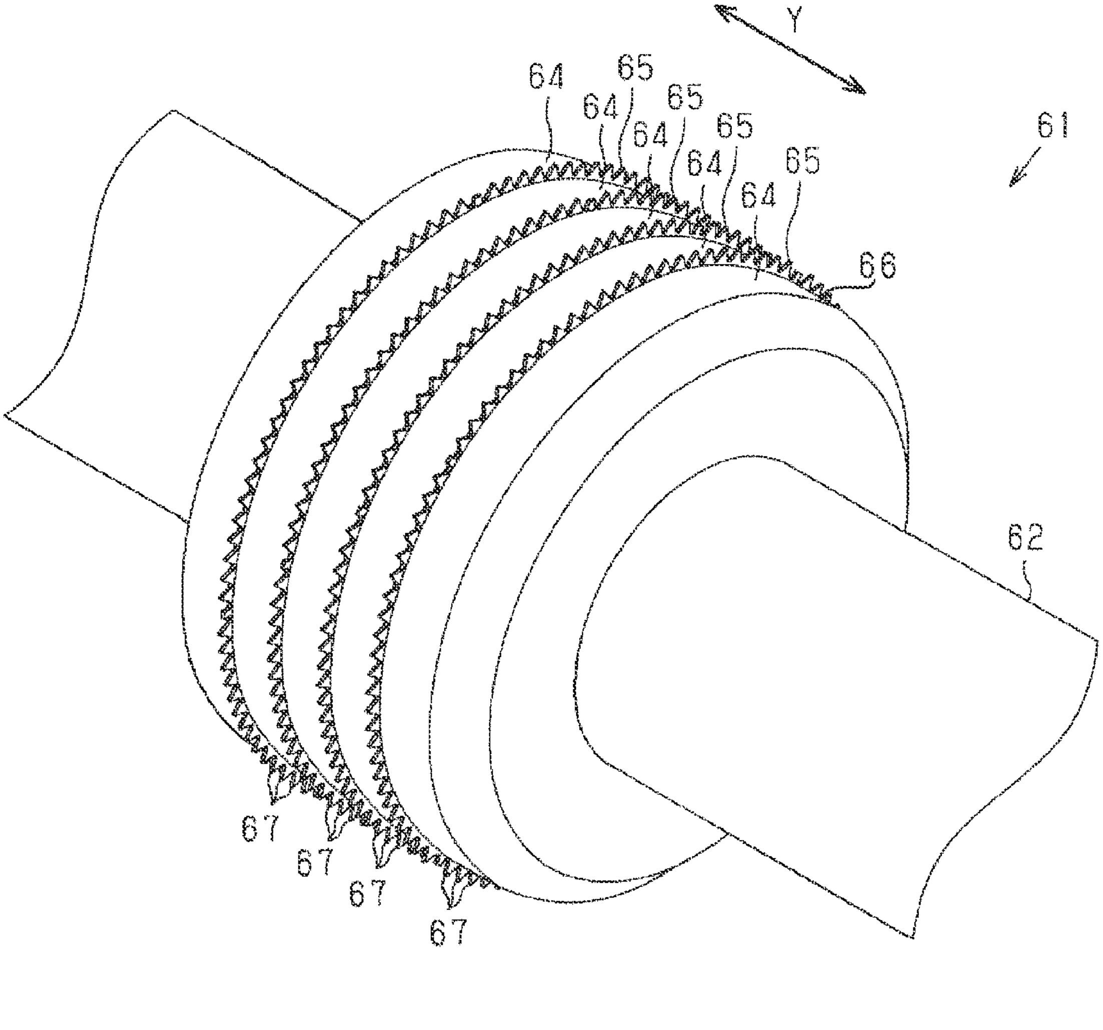
FIG. 5 is a perspective view of a first toothed roller constituting the pair of transport rollers of the ink jet printer of FIG. 1.

As shown in FIGS. 2 and 3, the pair of transport rollers 30 includes a drive roller 60 and a first toothed roller 61 as a driven roller. Here, as shown in FIG. 5, the first toothed roller 61 is configured to have a plurality of convex portions 67 capable of making point contact with the medium P on an outer peripheral portion 66 and to nip the medium P by the plurality of convex portions 67. Then, as shown in FIG. 3, when the transport path is divided into three regions S1, S2, and S3 in the width direction corresponding to the rotating shaft direction of the first toothed roller 61 and the Y-axis direction in the drawing, the pair of transport rollers 30 is arranged only in the central region S2.

Figure 6:
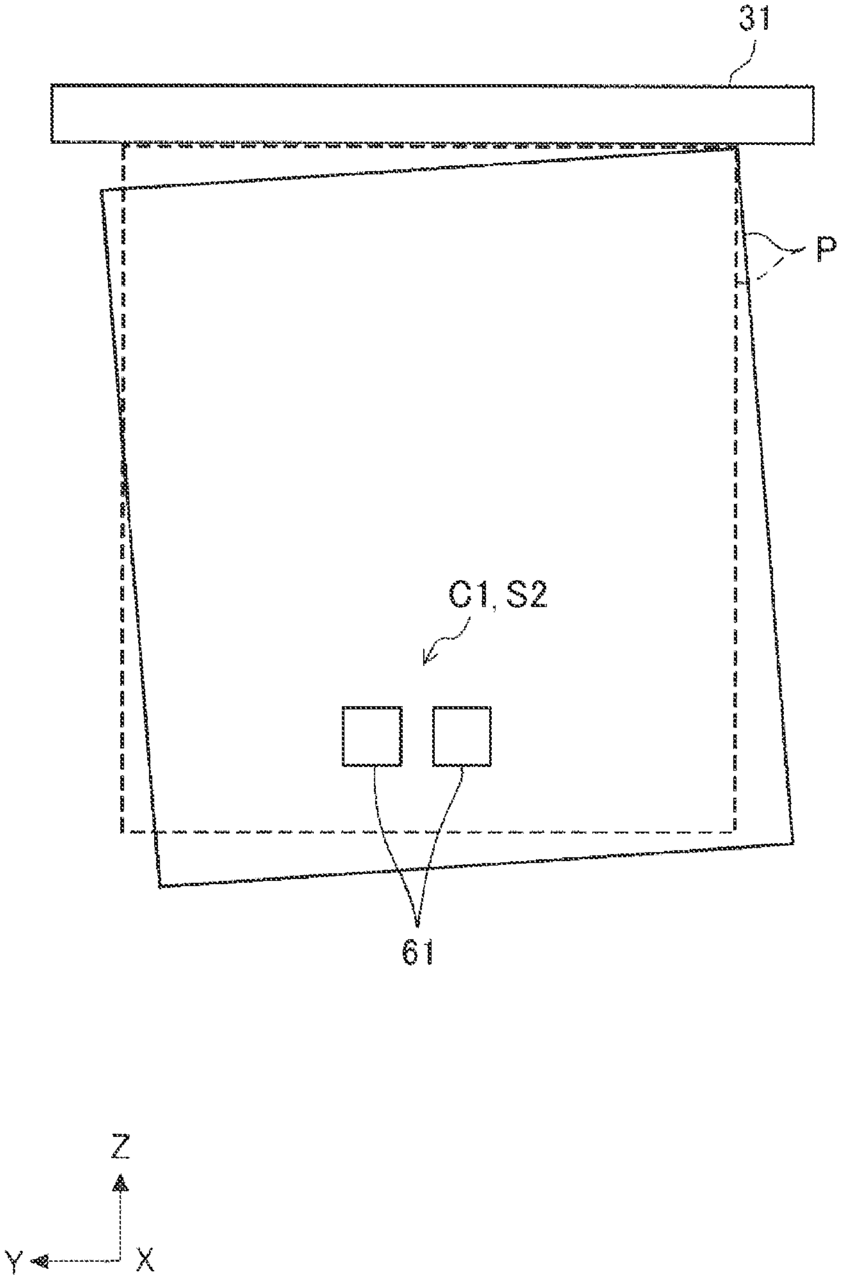
FIG. 6 is a conceptual diagram for explaining skew correction of a medium performed by using the ink jet printer of FIG. 1.

As described above, in the printer 1 of the present embodiment, the pair of transport rollers 30 is arranged only in the central region S2 when the transport path is divided into three in the width direction. Therefore, as shown in FIG. 6, the medium P can be rotated with a nip position, which is narrow in the width direction, in the central region S2 as the center C1 of a rotation axis. In this way, by setting a nip range to be narrow in the width direction, the medium P may be easily rotated with the nip position as the center C1 of the rotation axis, and the skewed transport of the medium P can be effectively corrected.

Figure 7:
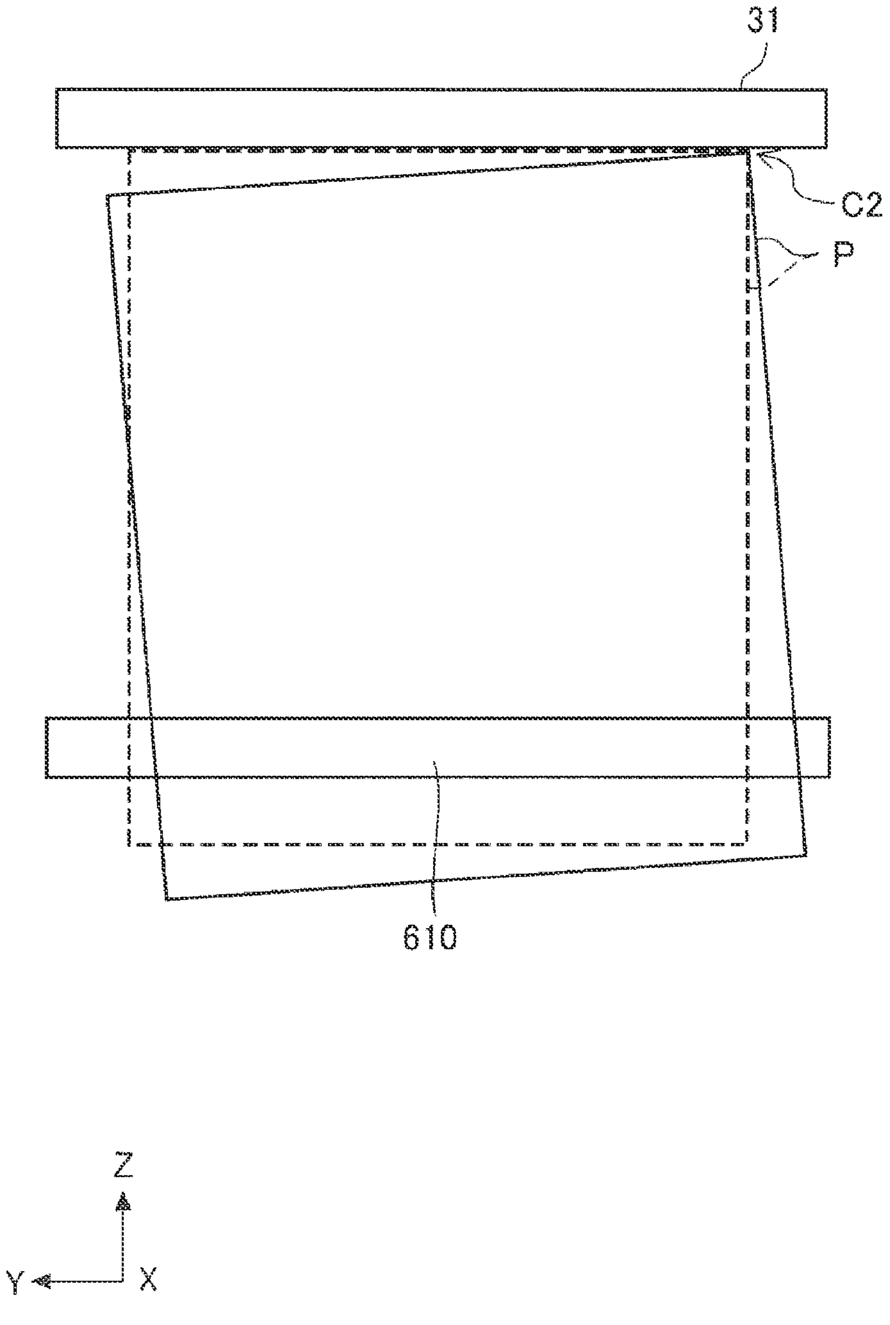
FIG. 7 is a conceptual diagram for explaining skew correction of a medium performed by using an ink jet printer of the related art.

On the other hand, in a printer provided with a pair of transport rollers 610 having a wide nip range in the width direction, which is generally used in the related art as shown in FIG. 7, it is difficult to rotate the medium P with the nip position by the pair of transport rollers 610 as the center of a rotation axis. In the printer shown in FIG. 7, the center C2 of the rotation axis when correcting the skewed transport of the medium P is a contact position with the pair of transport rollers 31. In the printer shown in FIG. 7, depending on the type of medium P used, since the medium P is nipped over an entire width direction, it may be difficult to rotate the medium P with respect to the nip position, it may be difficult for the medium to shift in the width direction due to a strong nip force, and it may be difficult to correct the skewed transport.

As described above, in the printer 1 of the present embodiment, the pair of transport rollers 30 includes the first toothed roller 61 having the convex portion 67 on the outer peripheral portion 66. It should be noted that it is easier to rotate the medium P in a configuration in which the medium P is bitten by one convex portion 67 and transported, but in a configuration in which the medium P is bitten by one convex portion 67 and transported, it is easier for the transport force to be lowered. However, in the printer 1 of the present embodiment, since the pair of transport rollers 30 includes the first toothed roller 61 that nips the medium P through the plurality of convex portions 67, the medium P can be transported by being bitten by the plurality of convex portions 67 of the first toothed roller 61, and a decrease in the force for transporting the medium P can be suppressed. That is, in the printer 1 of the present embodiment, it is possible to correct the skewed transport of the medium P without reducing the force for transporting the medium P.

Here, when the pair of transport rollers 30 is positioned downstream of the joined position in the reversion path 14 and the supply path T1 as in the printer 1 of the present embodiment, the ink attached to the medium P may be attached to the pair of transport rollers 30 when the recording is performed on both sides of the medium P. However, in the printer 1 of the present embodiment, since the medium P is nipped by the convex portion 67, the ink attached to the medium P is less likely to be attached to the pair of transport rollers 30, and the pair of transport rollers 30 is less likely to be contaminated with the ink, for example, when the recording is performed on both sides of the medium P. In addition, in a general skewed correction mechanism, the medium P is often slid in the width direction on the pair of transport rollers 30 due to the skewed correction, but in the present embodiment, since the medium P is nipped by the convex portion 67, it is possible to prevent the medium P from sliding in the width direction, and it is possible to prevent the ink attached to the medium P from being attached to the pair of transport rollers 30 due to the medium P sliding in the width direction.

The printer 1 of the present embodiment includes the pair of transport rollers 31 as a rotating body capable of switching between a first state in which a tip portion of the medium P being nipped by the pair of transport rollers 30 is passed and a second state in which the tip portion of the medium P being nipped by the pair of transport rollers 30 is not passed. However, as such a rotating body, one having a configuration other than the pair of transport rollers 31 as in the present embodiment may be provided. For example, as an example of the rotating body, in addition to the configuration in which the medium P is abutted against the nip portion of the rotating body constituting the pair of rollers as in the pair of transport rollers 31 of the present embodiment, the medium P may be abutted against a gate that moves in synchronization with the pair of rollers, or the medium P may be provided with a pair of rollers capable of temporarily reversely transporting the medium P.

When the rotating body includes the pair of rollers having a rotating shaft in the width direction as in the printer 1 of the present embodiment, a nip width in the width direction of the pair of transport rollers 30 is preferably 0.25 times or less the nip width in the width direction of the pair of transport rollers 31 which is the rotating body. With such a configuration, an effect of skewed correction can be particularly improved. By setting the nip width in the width direction of the pair of transport rollers 30 to 0.20 times or less the nip width in the width direction of the pair of transport rollers 31 which is the rotating body, the effect of skewed correction can be further improved.

As shown in FIG. 3, the pair of transport rollers 30 includes two drive rollers 60 and two first toothed rollers 61. The two drive rollers 60 have the same shape, and the two first toothed rollers 61 also have the same shape. In addition, as shown in FIG. 5, the first toothed roller 61 includes a rotating shaft 62, a plurality of annular holders 64 fitted to the rotating shaft 62, and a plurality of annular tooth members 65 fitted to the rotating shaft 62. The tooth member 65 has a plurality of convex portions 67 along an outer peripheral portion 66. The holder 64 and the tooth member 65 are alternately fitted to the rotating shaft 62, and one first toothed roller 61 has four tooth members 65. That is, the first toothed roller 61 includes a plurality of tooth members 65 having a plurality of convex portions 67 along the outer peripheral portion 66 in the width direction.

As described above, since the first toothed roller 61 includes the plurality of tooth members 65 having the plurality of convex portions 67 along the outer peripheral portion 66 in the width direction, the number of convex portions 67 of the entire first toothed roller 61 can be increased even when the number of convex portions 67 of each tooth member 65 is reduced. By reducing the number of convex portions 67 of each tooth member 65, it is possible to facilitate the manufacture of the tooth member 65 and reduce the cost. In addition, since the number of convex portions 67 of the entire first toothed roller 61 can be increased by providing the plurality of tooth members 65, it is possible to effectively suppress a decrease in the force for transporting the medium P. In the present embodiment, the two first toothed rollers 61 are provided, and one first toothed roller 61 is provided with the four tooth members 65. Then, the convex portions 67 are arranged so that one convex portion 67 bites the medium P in each tooth member 65.

As shown in FIG. 2, in the printer 1 of the present embodiment, the pair of transport rollers 31 includes a drive roller 68 and a second toothed roller 69 as a driven roller. The second toothed roller 69 has the same configuration as the first toothed roller 61. Here, an outer diameter of the first toothed roller 61 is preferably equal to or larger than the outer diameter of the second toothed roller 69.

Setting the outer diameter of the first toothed roller 61 to equal to or larger than the outer diameter of the second toothed roller 69 corresponds to increasing the outer diameter of the first toothed roller 61. By increasing the outer diameter of the first toothed roller 61, the time from when one convex portion 67 bites the medium P to when one convex portion 67 subsequently bites the medium P can be lengthened. By increasing the outer diameter of the first toothed roller 61, for example, when the recording is performed on both sides of the medium P and the first toothed roller 61 comes into contact with the medium P to which the ink is attached, the time from when one convex portion 67 comes into contact with the medium P to when one convex portion 67 comes into contact with the medium P can be lengthened. By lengthening the time, the time can be set as a sufficient drying time of the liquid, and the liquid attached to the convex portion 67 can be suppressed from being re-attached to the medium P.

As described above, in the printer 1 of the present embodiment, the transport path includes the supply path T1 for supplying the medium P mounted on the first medium cassette 3, the second medium cassette 4, the third medium cassette 5, and the fourth medium cassette 6 which are the mounting portions of the medium P to the line head 12, and the reversion path 14 that reverses the front and back of the medium P recorded by the line head 12 and supplies the medium P with the reversed front and back to the supply path T1. Here, the pair of transport rollers 30 and the pair of transport rollers 31 are arranged in the supply path T1, and as shown in FIG. 2, the supply path T1 includes a vertically upward path T1A that transports the medium P vertically upward between the pair of transport rollers 30 and the pair of transport rollers 31. Therefore, in the printer 1 of the present embodiment, the supply path T1 can be reduced in the horizontal direction, and the installation area of the printer 1 can be reduced. The pair of transport rollers 30 requires a large transport force because the vertically upward path T1A is included, but as described above, since the pair of transport rollers 30 includes the first toothed roller 61, the medium P can be transported by being bitten by the plurality of convex portions 67 of the first toothed roller 61, and the medium P can be transported with a large transport force.

Figure 4:
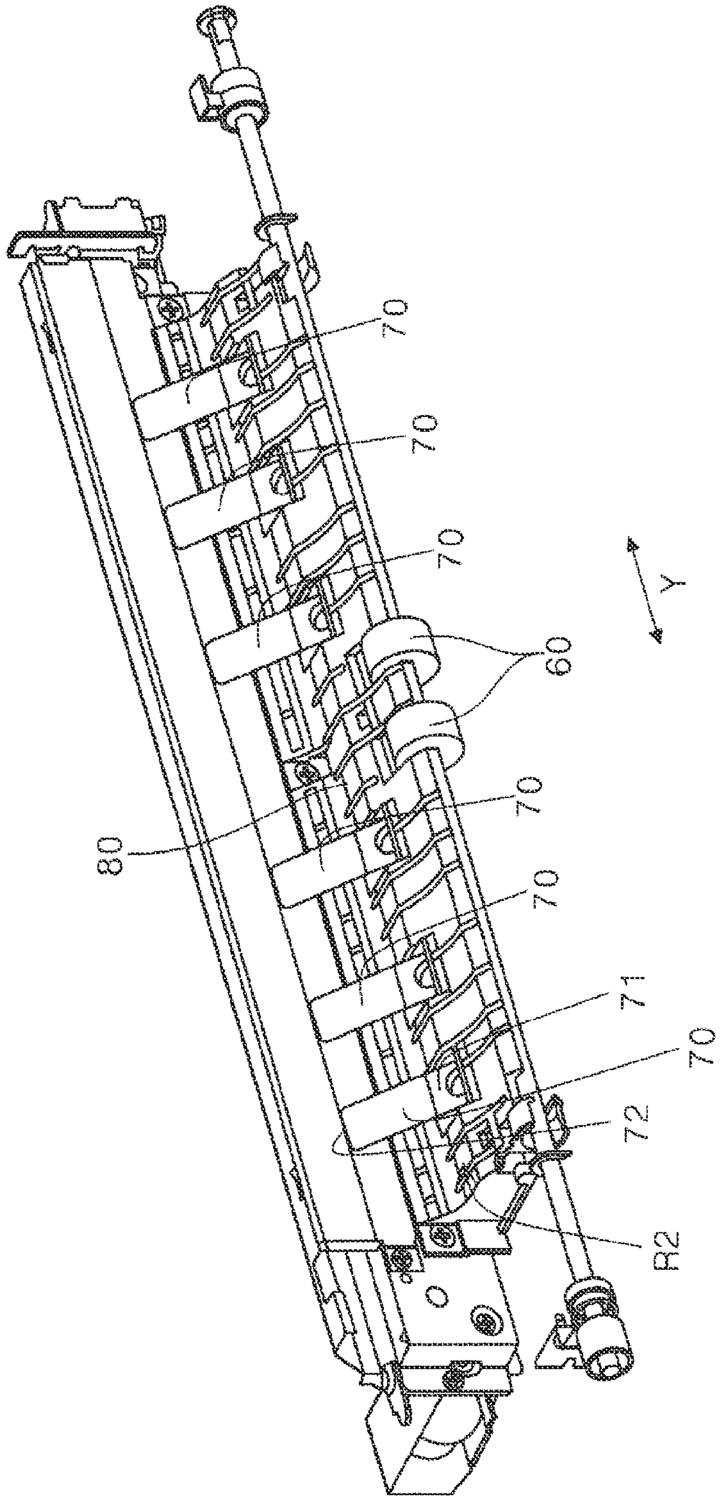
FIG. 4 is a perspective view showing the periphery of the pair of transport rollers of the ink jet printer of FIG. 1.

In addition, as shown in FIGS. 2 and 4, the supply path T1 includes a second curved path R2 which is a curved path between the pair of transport rollers 30 and the pair of transport rollers 31. Then, the second curved path R2 is provided with a bending space 80 that expands outward to allow the medium P to bend while the medium P is being transported in the second curved path R2. Therefore, in the printer 1 of the present embodiment, the bending space 80 can be used at the time of skewed correction, and a restoring force associated with the bending of the medium P can be used to effectively correct the skewed transport of the medium P.

In addition, as shown in FIGS. 2 and 4, the supply path T1 is provided with a fixed end 71 upstream of the bending space 80 and a free end 72 downstream of the fixed end 71, and a displacement member 70 is provided so that the free end 72 side can be displaced with respect to the fixed end 71 side. Here, as shown in FIGS. 2 and 4, the bending space 80 extends outward from the displacement member 70.

When the medium P bends too much outward during the transportation of the medium P, there is a risk of causing transport failure. However, in the printer 1 of the present embodiment, by displacing the displacement member 70, it is possible to prevent the medium P from bending too much outward during transportation of medium P. In addition, by displacing the displacement member 70, the medium P can be sufficiently bent at the time of skewed correction. In addition, since it is possible to reduce the risk of transport failure by providing the displacement member 70 even when the bending space 80 is large, the skewed transport of the medium P can be effectively corrected even when a medium P such as thick paper, which is generally difficult to perform the skewed correction, is used.

In addition, as shown in FIG. 1, the line head 12 is positioned on the same side as the outside of the second curved path R2, which is the side on which the bending space 80 is provided, with respect to the transport path of the medium P. On the other hand, the first toothed roller 61 is positioned on the same side as the inside of the second curved path R2 with respect to the transport path of the medium P. By positioning the line head 12 on the same side as the outside of the second curved path R2 with respect to the transport path, since it is not necessary to provide the line head 12 in a region surrounded by the supply path T1 and the reversion path 14, it is not necessary to widen the region surrounded by the supply path T1 and the reversion path 14, and the printer 1 can be miniaturized. In addition, when the recording is performed on both sides of medium P, the medium P supplied to the supply path T1 through the reversion path 14 has high possibility that the surface to which the ink is attached is swelled and curved due to the recording by the line head 12, and a transport failure occurs, but the printer 1 of the present embodiment can effectively suppress the transport failure of the medium P which is easily curved by the displacement member 70. "The same side as the outside of the second curved path R2" means to include "the same side as the outside portion of the second curved path R2" in the region other than the second curved path R2 in the transport path, in addition to "the outside portion of the second curved path R2". Similarly, "the same side as the inside of the second curved path R2" means to include "the same side as the inside portion of the second curved path R2" in the region other than the second curved path R2 in the transport path, in addition to "the inside portion of the second curved path R2".

The nip force of the first toothed roller 61 with respect to the medium P is preferably 3.0 N or more and 6.0 N or less. With such a configuration, it is possible to suppress a decrease in transportability of the medium P, and for example, suppress the attachment of the ink to the first toothed roller 61 when performing the recording on both sides of the medium P. By setting the nip force of the first toothed roller 61 with respect to the medium P to 3.5 N or more and 5.0 N or less, it is possible to further improve the effect of suppressing a decrease in transportability of the medium P, and suppressing the attachment of the ink to the first toothed roller 61 when performing the recording on both sides of the medium P.

Figure 8:
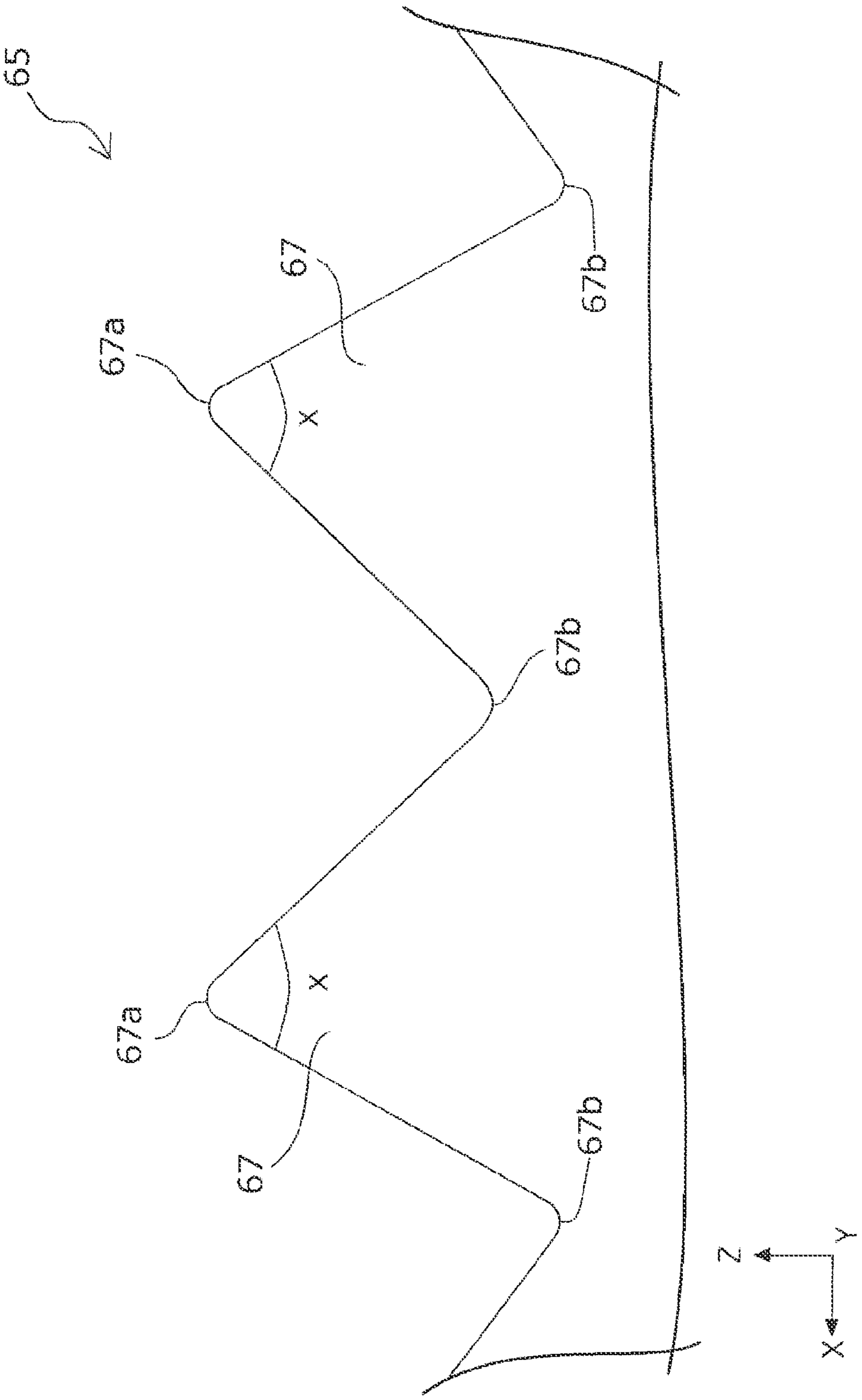
FIG. 8 is a schematic view of a tooth member of the ink jet printer of FIG. 1 as viewed in a width direction.
Figure 9:
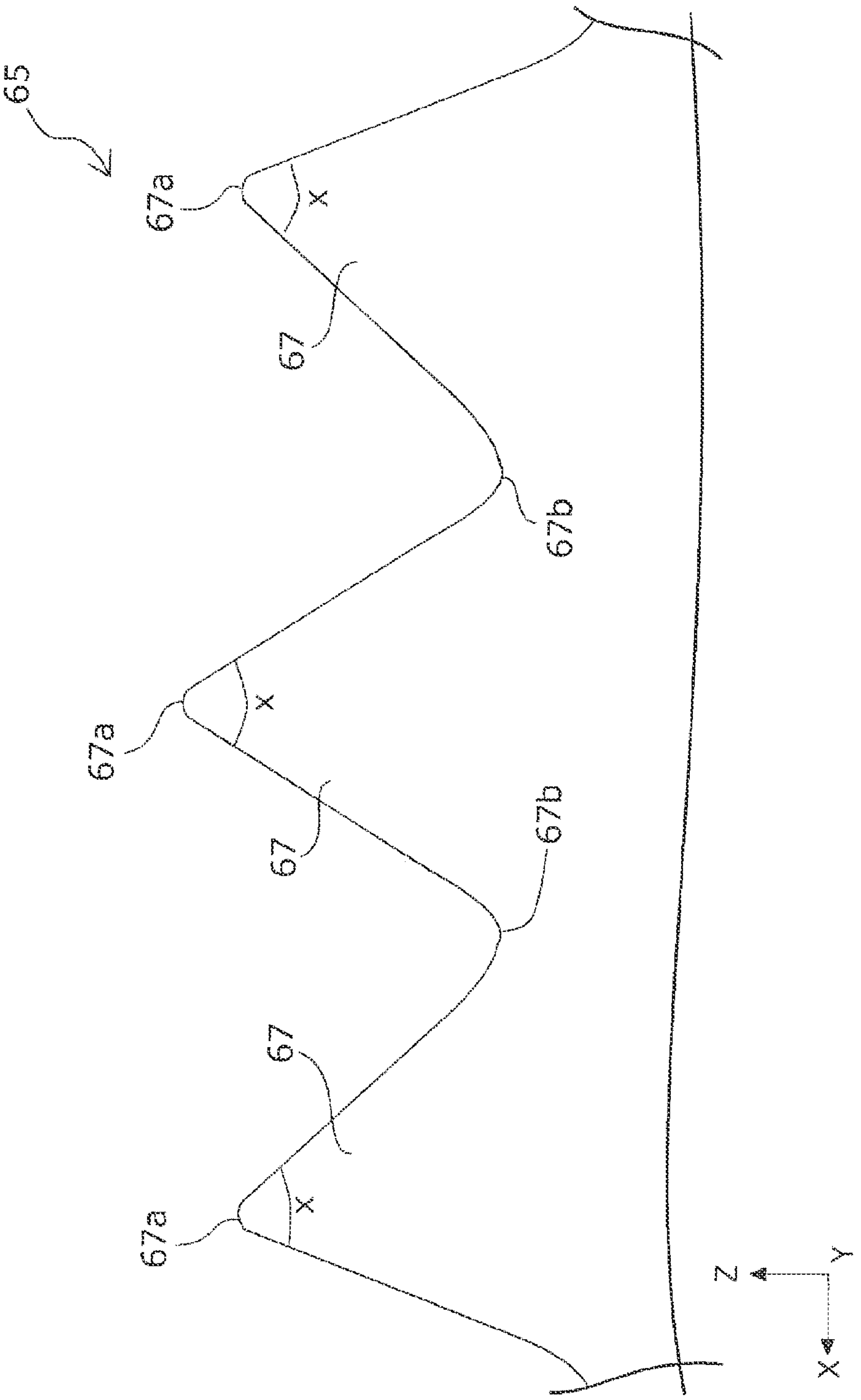
FIG. 9 is a schematic view of a tooth member of an ink jet printer different from the ink jet printer of FIG. 1 as viewed in the width direction.
Figure 10:
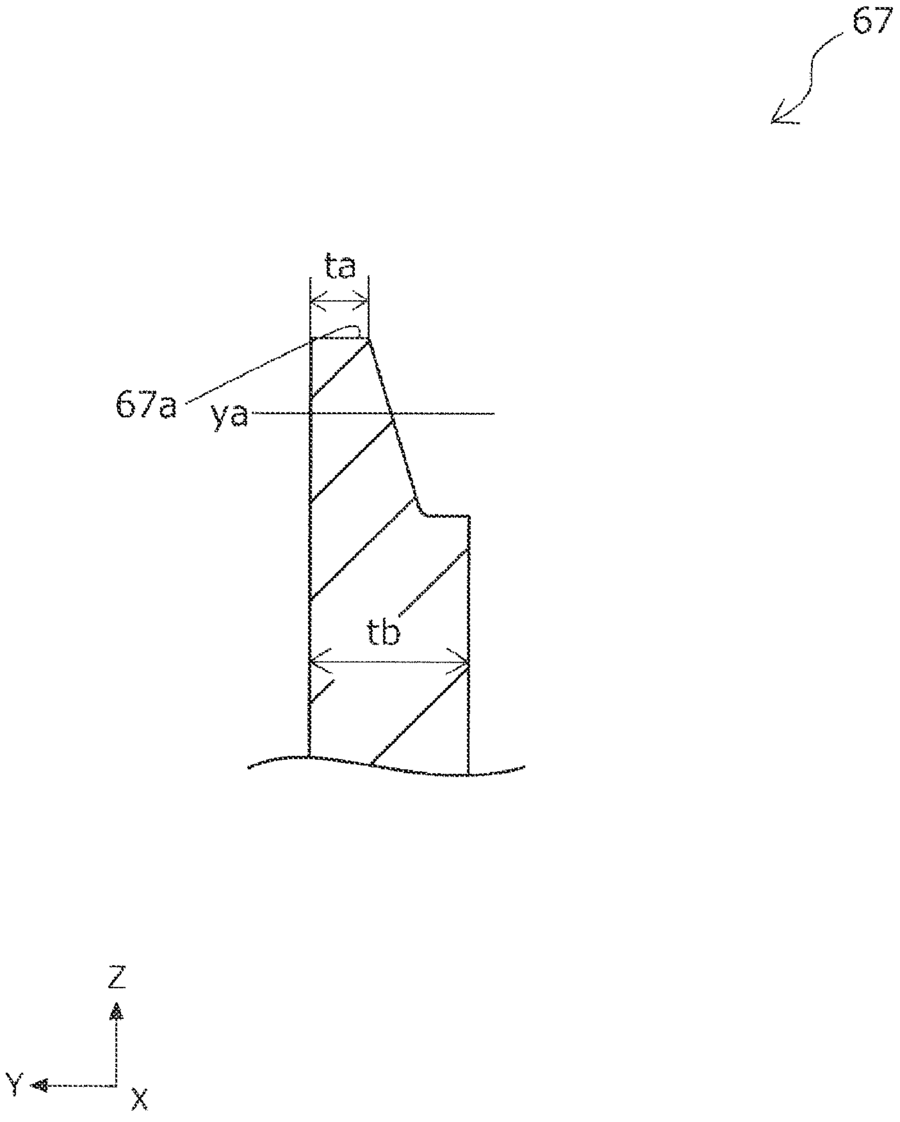
FIG. 10 is a schematic sectional view of the tooth member of FIG. 9 as viewed from a direction intersecting the width direction.
Figure 11:
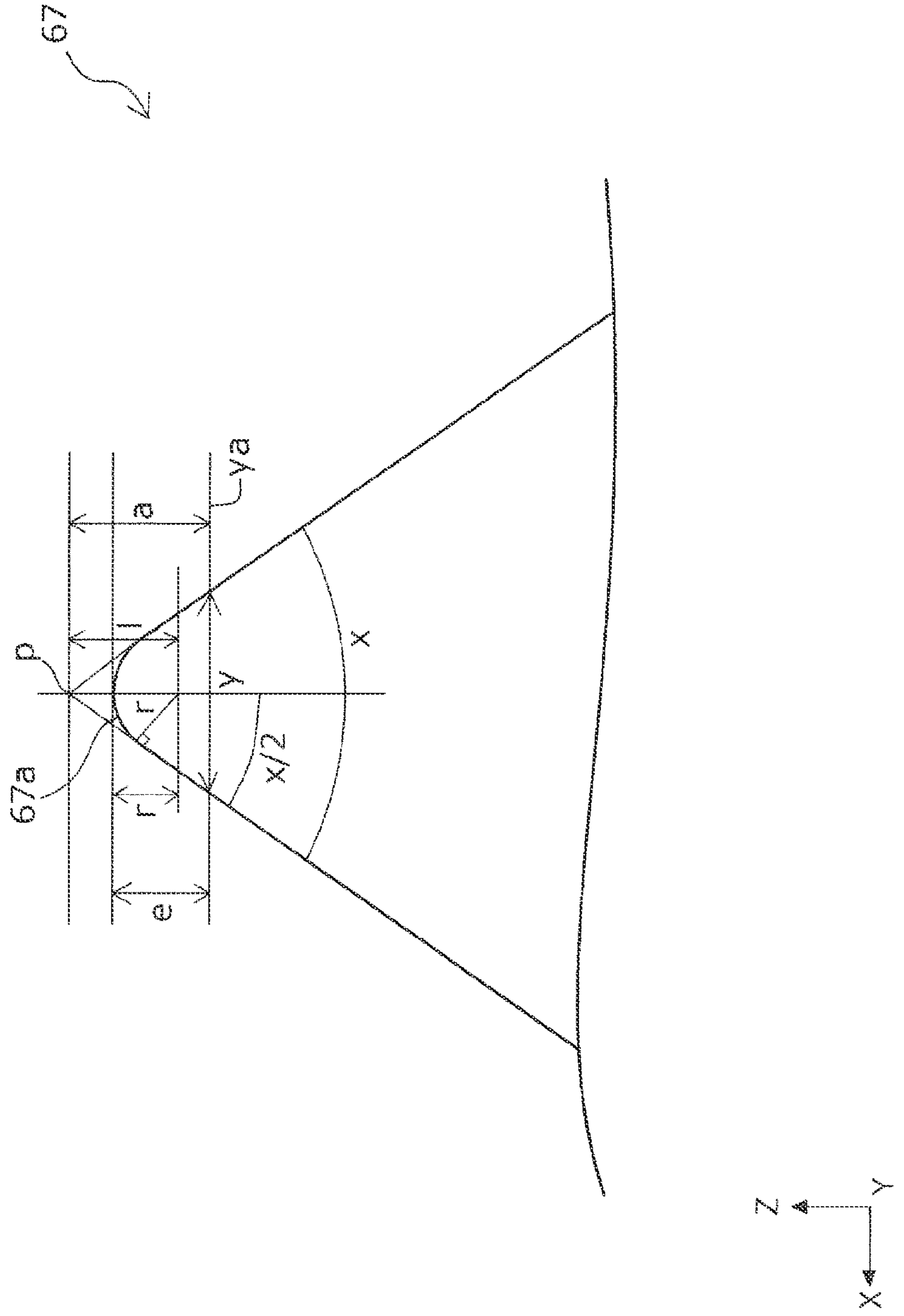
FIG. 11 is a schematic view for explaining a convex portion.

Next, the first toothed roller 61 applicable to the printer 1 of the present disclosure will be described in detail particularly from the viewpoint of the tooth member 65 with reference to FIGS. 8 to 11. Here, FIG. 8 is a view showing the tooth member 65 of the printer 1 shown in FIGS. 1 to 7 above, and FIGS. 9 and 10 are views showing the tooth member 65 of a printer according to an embodiment of the present disclosure, which is different from the printer 1. The printer of FIGS. 9 and 10 has exactly the same configuration as the printer 1 except for the first toothed roller 61. In addition, FIG. 11 is a schematic view for explaining the convex portion 67.

As shown in FIG. 5, the printer 1 shown in FIGS. 1 to 7 includes a first toothed roller 61 each having four tooth members 65. Here, the four tooth members 65 each have the same configuration, and are also arranged so that the convex portions 67 are out of phase in a circumferential direction. FIG. 8 is an enlarged view of a peripheral portion of the convex portion 67 of the tooth member 65 of the printer 1 shown in FIGS. 1 to 7.

Here, when viewed in the width direction as shown in FIG. 8, the tooth member 65 has an angle x formed by a tip portion 67*a* of the convex portion 67 of 80°. The tooth member 65 shown in FIG. 8 has 37 convex portions 67 per one tooth member 65. The tip portion 67*a* of the convex portion 67 of the present embodiment is rounded in an arc shape with a radius of 0.03 mm, but may be sharp. The angle x formed by the tip portion 67*a* of the convex portion 67 is an angle formed by the sides of the convex portion 67 at a bite position ya described later when the convex portion 67 is generally rounded. In other words, the angle x is an angle formed by both sides when each of the sides of the convex portion 67 is virtually extended.

On the other hand, the first toothed roller 61 of the printer shown in FIGS. 9 and 10 includes a first toothed roller 61 each having five tooth members 65. Here, the five tooth members 65 each have the same configuration, and are also arranged so that the convex portions 67 are out of phase in the circumferential direction, similarly to the first toothed roller 61 of the printer 1 shown in FIGS. 1 to 7. FIG. 9 is an enlarged view of a peripheral portion of the convex portion 67 of the tooth member 65 of the printer.

Here, when viewed in the width direction as shown in FIG. 9, the tooth member 65 has an angle x formed by a tip portion 67*a* of the convex portion 67 of 60°. The tooth member 65 shown in FIG. 9 has 57 convex portions 67 per one tooth member 65, and the number of convex portions 67 per one tooth member 65 is larger than that of the tooth member 65 shown in FIG. 8. This is because the angle x formed by the tip portion 67*a* of the convex portion 67 is small, so that a distance between the convex portions 67 adjacent to each other in the circumferential direction can be shortened. The tip portion 67*a* of the convex portion 67 of the present embodiment is rounded in an arc shape having a radius of 0.05 mm.

The tooth member 65 secures the transport force with the medium P by pressing the convex portion 67 against the transported medium P and causing the periphery of the tip portion 67*a* to bite into the medium P. The bite position ya in FIGS. 10 and 11 corresponds to the position of the surface of the medium P when the convex portion 67 is pressed against the transported medium P. The tooth member 65 of the printer shown in FIGS. 9 and 10 has a convex portion 67 having a thickness t of 0.05 mm at the bite position ya. On the other hand, the tooth member 65 shown in FIG. 8 has a convex portion 67 having a thickness t of 0.10 mm at the bite position ya, which is thicker as a whole than the tooth member 65 shown in FIG. 9. Therefore, the thicknesses in the width direction of the first toothed roller 61 of the printer 1 shown in FIGS. 1 to 7 and the first toothed roller 61 of the printer shown in FIGS. 9 and 10 are substantially the same, but the first toothed roller 61 per printer 1 shown in FIGS. 1 to 7 includes four tooth members 65, whereas the first toothed roller 61 per printer shown in FIGS. 9 and 10 includes five tooth members 65. Here, as shown in FIG. 10, the tooth member 65 of the printer shown in FIGS. 9 and 10 has a thickness tb of 0.20 mm in a region other than the periphery of the tip portion 67*a* of the convex portion 67 and becomes thinner toward the tip portion 67*a* of the thickness ta. However, it is not limited to such a configuration. In the configuration of the present embodiment, the thickness t of the convex portion 67 corresponds to a thickness ta of the tip portion 67*a*.

When a force that presses the convex portion 67 against the transported medium P is strong, for example, in a case in which the recording is performed on the second surface when performing the recording on both sides of the medium P, there is a risk that the ink ejected on the first surface is attached to the convex portion 67 and the ink is transferred to the medium P. Therefore, it is necessary for the tooth member 65 to secure the transport force with the medium P without making the force for pressing the convex portion 67 too strong. Therefore, it is conceivable to reduce a contact area between the medium P and the convex portion 67. By reducing the contact area between the medium P and the convex portion 67, it is possible to secure the transport force without making the force for pressing the convex portion 67 against the medium P too strong. As a result, the medium P can be appropriately transported, and the ink transfer to the medium P can be reduced.

Here, a method of calculating the contact area between the medium P and the convex portion 67 will be described with reference to FIG. 11. The contact area is calculated by a length y of the convex portion 67 in contact with the medium P at the bite position ya bitten by a biting amount e from the tip portion 67*a* and the thickness t of the convex portion 67. In FIG. 11, a distance l between a tangential intersection p extending from the tip portion 67*a* and the center of the arc of the tip portion 67*a* is expressed by the following equation. Here, x is the angle formed by the tip portion 67*a* of the convex portion 67 as described above.

$$l=r/\sin(x/2)$$

According to the above equation, a distance a between the intersection p and the bite position ya is expressed by the following equation.

$$a=l-r+e=r/\sin(x/2)-r+e$$

According to the above equation, the length y at the bite position ya is expressed by the following equation.

$$y=2\cdot a\cdot\tan(x/2)=2\cdot(r/\sin(x/2)-r+e)\cdot\tan(x/2)$$

Here, assuming that the thickness of the convex portion 67 is t as described above, a contact area d of the convex portion 67 per sheet is expressed by the following equation.

$$d=t\cdot y=2\cdot t\cdot(r/\sin(x/2)\cdot r+e)\cdot\tan(x/2)$$

As described above, in the first toothed roller 61 of the printer shown in FIGS. 9 and 10, the angle x formed by the tip portion 67*a* of the convex portion 67 viewed in the width direction as shown in FIG. 9 is 60°. Here, the angle x is preferably 60° or more and 70° or less. As the number of convex portions 67 increases, foreign matter such as liquid tends to be attached to the tooth member 65, but by setting the angle formed by the tip portion 67*a* of the convex portion 67 to 60° or more, it is possible to suppress the number of the convex portions 67 from being too large, and it is possible to suppress the foreign matter such as ink from being attached to the tooth member 65. In addition, when the number of convex portions per one first toothed roller is too small, the transport force of the medium P tends to decrease, but by setting the angle formed by the tip portion 67*a* of the convex portion 67 to 70° or less, a distance between adjacent convex portions 67 in a circumferential direction can be shortened in each tooth member 65, it is possible to suppress the number of convex portions 67 per one tooth member 65 from being too small, and it is possible to suppress a decrease in the transport force of the medium P. The first toothed roller 61 having the tooth member 65 shown in FIG. 9 having the angle x of 60° has a clearly larger transport force of the medium P than the first toothed roller 61 having the tooth member 65 shown in FIG. 8 having the angle x of 80°.

In addition, when the angle formed by the tip portion 67*a* of the convex portion 67 is set to be equal to or less than a specific angle, the distance from the tip portion 67*a* to a valley portion 67*b* (not shown) is large, and the ink is likely to be deposited. When the ink is deposited on the valley portion 67*b*, it may be a factor of ink transfer to the medium P. Here, the specific angle is, for example, 50°. Therefore, the ink transfer can be reduced by setting the angle formed by the tip portion 67*a* of the convex portion 67 to 60° or more. The first toothed roller 61 having the tooth member 65 shown in FIG. 9 having the angle x of 60° has clearly less ink transfer to the medium P than the first toothed roller 61 having a tooth member (not shown) having an angle x of 50°.

In the present embodiment, the tooth member 65 is formed by press processing, but the number of convex portions 67 can be increased even when the angle x exceeds 70° by forming the tooth member 65 by etching processing. However, in this case, the etching processing or the like is required, and for example, when the tooth member 65 is formed by the etching processing, the cost of the tooth member 65 increases. In addition, by increasing the number of tooth members 65, it is possible to suppress the number of convex portions 67 per one first toothed roller 61 from being too small. However, by increasing the number of tooth members 65, it may lead to an increase in cost, the thickness of the first toothed roller 61 in the width direction is thicker, and there is a possibility that the skewed transport of the medium P cannot be effectively corrected.

As described above, in the first toothed roller 61 of the printer shown in FIGS. 9 and 10, the thickness t of the convex portion 67 in the width direction is 0.05 mm. Here, the thickness t is preferably 0.05 mm or more and 0.10 mm or less. It is difficult to easily make the thickness t of the convex portion 67 in the width direction thin, and when it is made thin, it causes an increase in cost, but by setting the thickness t of the convex portion 67 in the width direction to 0.05 mm or more, it can be easily constructed by press processing or the like, and the tooth member 65 can be easily constructed at low cost. In addition, when the thickness of the convex portion 67 in the width direction is made too thick, the foreign matter such as ink tends to be attached to the convex portion 67, and the foreign matter attached to the convex portion 67 may be transferred to the medium P, but by setting the thickness t of the convex portion 67 in the width direction to 0.10 mm or less, it is possible to suppress the thickness of the convex portion 67 in the width direction from being too thick, and it is possible to reduce the possibility that the foreign matter attached to the convex portion 67 is transferred to the medium P.

The present disclosure is not limited to the embodiments described above, and various modifications can be made within the scope of the disclosure described in the claims, and these are also included in the scope of the present disclosure.

What is claimed is:

1. A recording device comprising:

a pair of transport rollers for transporting a medium;

a rotating body provided downstream of the pair of transport rollers in a transport path of the medium and configured to switch between a first state in which a tip portion of the medium being nipped by the pair of transport rollers is passed and a second state in which the tip portion of the medium being nipped by the pair of transport rollers is not passed; and a recording portion provided downstream of the rotating body in the transport path and performing recording on the medium by discharging a liquid, wherein the pair of transport rollers includes a first toothed roller having a plurality of convex portions configured to make point contact with the medium on an outer peripheral portion and nipping the medium by the plurality of the convex portions and a second driving roller that drives the first toothed roller, and when the transport path of the medium is divided into three regions in a width direction corresponding to a length of a rotating shaft that supports the second driving roller, the three regions being a central region of the rotating shaft, a first side region, and a second side region, the pair of transport rollers is arranged only in the central region such that no other transport rollers are arranged in the first side region and the second side region that are on both sides of the central region.

2. The recording device according to claim 1, wherein the first toothed roller includes, in the width direction, a plurality of tooth members having the plurality of convex portions configured to make point contact with the medium along the outer peripheral portion.

3. The recording device according to claim 1, wherein the transport path includes a reversion path in which the medium on which recording is performed by the recording portion is reversed and the medium reversed is supplied to a supply path, the rotating body includes a second toothed roller having a plurality of convex portions configured to make point contact with the medium on an outer peripheral portion, and an outer diameter of the first toothed roller is equal to or larger than an outer diameter of the second toothed roller.

4. The recording device according to claim 1, wherein the transport path includes a supply path for supplying the medium mounted on a mounting portion to the recording portion, the pair of transport rollers and the rotating body are arranged in the supply path, and the supply path includes a vertically upward path for transporting the medium vertically upward between the pair of transport rollers and the rotating body.

5. The recording device according to claim 4, wherein the supply path includes a curved path between the pair of transport rollers and the rotating body, and the curved path is provided with a bending space that expands to an outside to allow bending of the medium being transported in the curved path.

6. The recording device according to claim 5, wherein the supply path is provided with a displacement member in which a fixed end is provided upstream of the bending space and a free end is provided downstream of the fixed end so that a free end side is configured to be displaced with respect to the fixed end, and the bending space extends to an outside of the displacement member.

7. The recording device according to claim 5, wherein the recording portion is positioned in a direction of the expansion of the bending space relative to the transport path, and the first toothed roller is positioned on a side of the transport path, the side being an inside of the curved path.

8. The recording device according to claim 1, wherein a nip width of the pair of transport rollers in the width direction is 0.25 times or less a nip width of the rotating body in the width direction.

9. The recording device according to claim 1, wherein a nip force of the first toothed roller with respect to the medium is 3.0 N or more and 6.0 N or less.

10. The recording device according to claim 1, wherein as viewed in the width direction, an angle formed by a tip portion of each of the plurality of convex portions is 60° or more and 70° or less.

11. The recording device according to claim 10, wherein a thickness of the convex portion in the width direction is 0.05 mm or more and 0.10 mm or less.

12. The recording device according to claim 1, wherein when the rotating body is in the second state, the medium abuts against the rotating body and stops.

13. The recording device according to claim 1, wherein the pair of transport rollers includes two first toothed rollers in the central region.

14. The recording device according to claim 1, wherein the supply path is provided with a displacement member in which a fixed end is provided upstream of a bending space and a free end is provided downstream of the fixed end so that a free end side is configured to be displaced with respect to the fixed end, and the first toothed roller does not overlap the displacement member in the width direction.

15. The recording device according to claim 1, wherein the second driving roller is driven by a motor when driving the first toothed roller.

16. The recording device according to claim 1, wherein the transport path includes a reversion path in which the medium on which recording is performed by the recording portion is reversed and the medium reversed is supplied to a supply path, the rotating body includes a second toothed roller having a plurality of convex portions configured to make point contact with the medium on an outer peripheral portion, and an outer diameter of the first toothed roller is larger than an outer diameter of the second toothed roller.

* * * * *